United States Patent
Lee

(10) Patent No.: US 8,582,027 B2
(45) Date of Patent: Nov. 12, 2013

(54) IMAGE PICK-UP APPARATUS

(75) Inventor: Chun-Yu Lee, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/532,801

(22) Filed: Jun. 26, 2012

(65) Prior Publication Data

US 2013/0038774 A1 Feb. 14, 2013

(30) Foreign Application Priority Data

Aug. 11, 2011 (TW) .............................. 100128665 A

(51) Int. Cl.
*H04N 5/225* (2006.01)
(52) U.S. Cl.
USPC .......................................... 348/375
(58) Field of Classification Search
USPC .................. 348/335, 340, 373–376
See application file for complete search history.

(56) References Cited

U.S. PATENT DOCUMENTS

| | | | |
|---|---|---|---|
| 7,268,335 B2* | 9/2007 | Hiltunen | 250/208.1 |
| 7,528,880 B2* | 5/2009 | Yamaguchi et al. | 348/335 |
| 8,184,195 B2* | 5/2012 | Duparre | 348/340 |
| 2008/0019026 A1* | 1/2008 | Feng et al. | 359/819 |
| 2013/0037695 A1* | 2/2013 | Lee | 250/208.1 |

* cited by examiner

*Primary Examiner* — Timothy J Henn
(74) *Attorney, Agent, or Firm* — Altis & Wispro Law Group, Inc.

(57) ABSTRACT

An image pick-up apparatus includes a lens module, a base plate, and an image sensor. The lens module includes a lens barrel and an optical lens received in the lens barrel. The base plate has two opposite surfaces and a rectangular through hole defined between the two surfaces. The image sensor is fixed to the base plate. The image sensor has a top surface facing the lens module. The top surface includes a rectangular exposed portion in the through hole. The exposed portion includes a rectangular optically effective region configured for capturing images. A distance between neighboring long sides of the optically effective region and the exposed portion being greater than 0.47 times of a length of the through hole, and a distance between the neighboring short sides of the optically effective region and the exposed portion being greater than 0.27 times of the length.

5 Claims, 2 Drawing Sheets

IMAGE PICK-UP APPARATUS

BACKGROUND

1. Technical Field

The present disclosure relates generally to an image pick-up apparatus having a lens module and an image sensor.

2. Description of Related Art

Image pick-up apparatuses are used in a variety of consumer electronic devices, such as notebook computers, personal digital assistants (PDAs), and cellular telephones. An image pick-up apparatus includes a lens module, a base plate, and an image sensor mounted on the base plate. The lens module includes a lens barrel and a number of lenses received in the lens barrel. The base plate is fixed to an end of the lens barrel, and defines a through hole for exposing an optically effective region of the image sensor and allowing light to be transmitted from the lens module onto the effective region of the image sensor. An inner wall of the base plate adjacent to the through hole may reflect light back onto the effective region of the image sensor, which may cause glare during image capture.

Therefore, there is a need for an image pick-up apparatus to overcome the above mentioned limitations.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the views.

DETAILED DESCRIPTION

Figure 1:
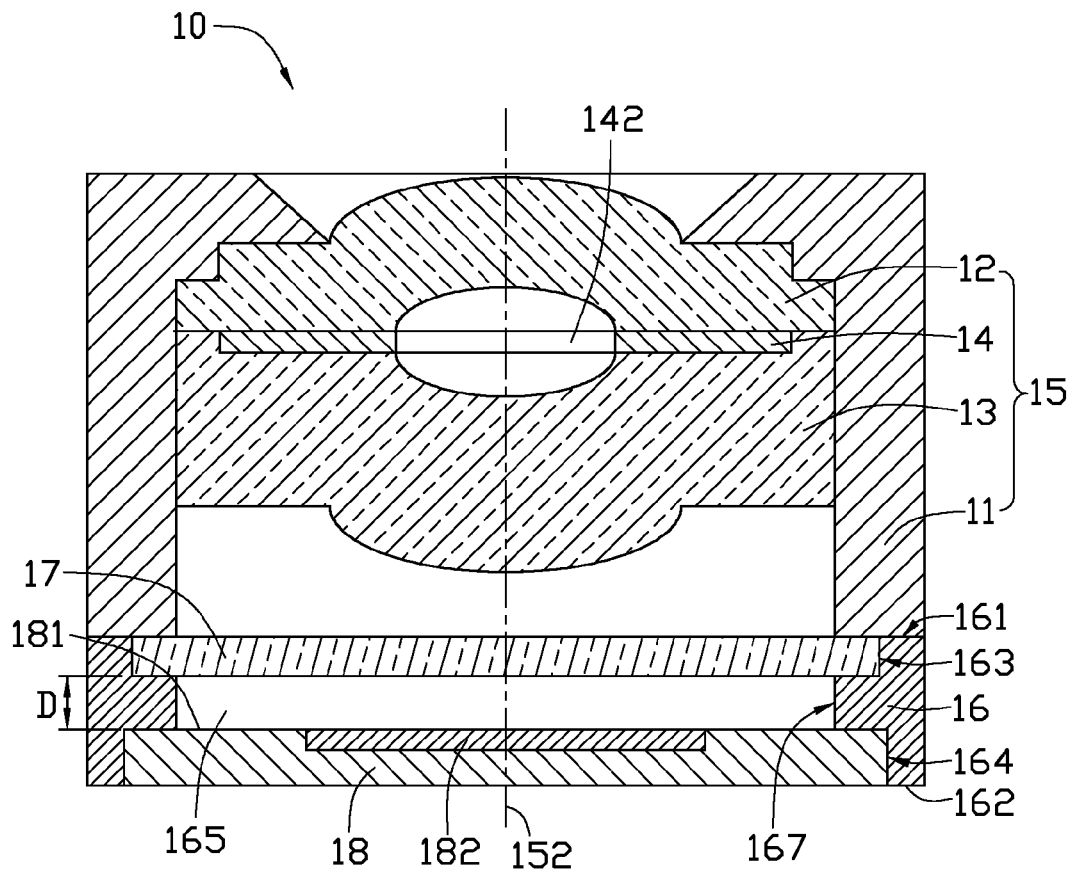
FIG. 1 is a sectional view of an image pick-up apparatus according to an exemplary embodiment, comprising a base plate and an image sensor fixed together.

Referring to FIG. 1, an image pick-up apparatus 10 according to a first exemplary embodiment includes a lens module 15, a base plate 16, an IR-Cut filter 17, and an image sensor 18. The lens module 15 includes a lens barrel 11, a first optical lens 12, a second optical lens 13, and a light shielding plate 14.

The first optical lens 12 and the second optical lens 13 are optically aligned with each other about an optical axis 152. The light shielding plate 14 is arranged between the first and second optical lenses 12 and 13, and is aligned with the first and second optical lenses 12 and 13 about the optical axis 152. The light shielding plate 14 defines a round through hole 142 at the center thereof for allowing the passage of light. The first optical lens 12, the second optical lens 13, and the light shielding plate 14 are received in the lens barrel 11. The first and second optical lenses 12 and 13 focus light passing therethrough.

The base plate 16 has a first surface 161, an opposite second surface 162, a first recess 163 defined in the first surface 161, a second recess 164 defined in the second surface 162, and a through hole 165 interconnecting the first recess 163 and the second recess 164. The first recess 163, the second recess 164, and the through hole 165 each have a rectangular cross-section and are aligned with each other. The first recess 163 and the second recess 164 are wider than the diameter of the through hole 165. The through hole 165 has a depth D along an axis parallel with the optical axis 152. That is, an inner surface 167 of the through hole 165 has a length equal to depth D along an axis parallel with the optical axis 152. The first surface 161 of the base plate 16 is attached to an end of the lens barrel 11 so that the base plate 16 is fixed to the lens barrel 11. In this embodiment, the base plate 16 is comprised of ceramic material.

The infrared-cut (IR-cut) filter 17 allows visible light to be transmitted and filters the IR light transmitting therethrough. The IR-cut filter 17 is rectangular and received in the first recess 163. In this embodiment, the IR-cut filter 17 is attached to the base plate 16 by applying blue between the IR-cut filter 17 and the base plate 16.

The image sensor 18 is fixed in the second recess 18. In this embodiment, the image sensor 18 is fixed to the base plate 16 by soldering. The image sensor 18 has a top surface 181 facing the lens module 15 and a rectangular optically effective region 182 defined in the top surface 181. The optically effective region 182 is aligned with the through hole 165 about the optical axis 152 and has a smaller area than the opening of the through hole 165. The optically effective region 182 is configured for capturing images.

Figure 2:
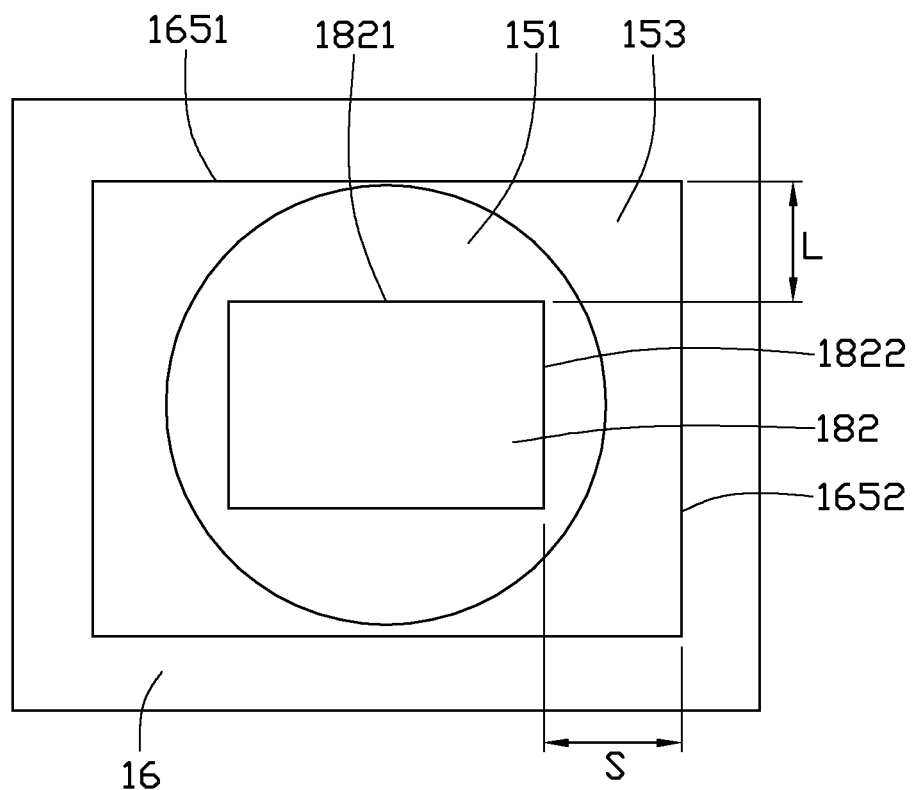
FIG. 2 is a front view of the base plate and the image sensor fixed together as in FIG. 1, showing a relationship between a through hole of the base plate and an effective region of the image sensor.

Referring to FIG. 2, in a projection plane perpendicular to the optical axis 152, the optically effective region 182 has two opposite, parallel first long sides 1821 and two opposite, parallel first short sides 1822. The through hole 165 has two opposite second long sides 1651 parallel to the first long sides 1821, and two opposite second short sides 1651 parallel to the second short sides 1822. A first distance L is defined between the neighboring first and second long sides 1821 and 1651, and a second distance S is defined between the neighboring first and second short sides 1822 and 1652. The first distance L is greater than 0.27 times of the depth D of the through hole 165, and the second distance S is greater than 0.47 times of the depth of the through hole 165. In this situation, less light striking on the inner surface 167 is reflected to the optically effective region 182 of the image sensor 18 and thereby, excessive glare in the image pick-up apparatus 10 is prevented.

Referring to FIG. 2, the top surface 181 of the image sensor 18 includes an illuminable area 151 and a non-illuminable area 153. Light transmitted through the lens module 15 is projected onto the illuminable area 151. The illuminable area 151 is round in this embodiment. The optically effective region 182 of the image sensor 18 is entirely within the illuminable area 151. The illuminable area 151 is surrounded by the non-illuminable area. In this situation, no light transmitted by the lens module 15 can strike on the inner surface 167 and thereby, in the image pick-up apparatus 10 glare is eliminated or at least kept to a minimum.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. An image pick-up apparatus:
   a lens module comprising a lens barrel and an optical lens received in the lens barrel, the optical lens having an optical axis;
   a base plate having a first surface facing toward the lens module, and an opposite second surface, the base plate having a hole portion with a rectangular through hole defined between the first surface and the second surface; an image sensor fixed to the base plate, the hole portion being arranged between the lens module and the image sensor, the image sensor having a top surface facing the lens module, the top surface including a rectangular exposed portion in the through hole, the exposed portion including a rectangular optically effective region configured for capturing images, the optically effective region having two parallel long sides and two parallel short sides, the exposed portion having two parallel long sides parallel to the long sides of the optically effective region, and two parallel short sides parallel to the short sides of the optically effective region, a distance between the neighboring long sides of the optically effective region and the exposed portion being greater than 0.27 times of a length of the through hole, and a distance between the neighboring short sides of the optically effective region and the exposed portion being greater than 0.47 times of the length.

2. The image pick-up apparatus of claim 1, wherein the exposed portion includes an illuminable region on which light transmitted through the lens module is projected and a non-illuminable region with no light transmitted through the lens module being projected thereon, the illuminable region being round-shaped and entirely surrounded by the non-illuminable region.

3. The image pick-up apparatus of claim 1, wherein the base plate is comprised of ceramic material.

4. The image pick-up apparatus of claim 1, further comprising an IR-cut filter, the first surface defining a first recess therein, the first recess being in communication with the through hole, the IR-cut filter being received in the first recess.

5. The image pick-up apparatus of claim 4, wherein the second surface defines a second recess in communication with the through hole, and the image sensor is received in the second recess.

* * * * *